(12) United States Patent
Osawa

(10) Patent No.: US 11,399,292 B2
(45) Date of Patent: Jul. 26, 2022

(54) USER TERMINAL AND RADIO COMMUNICATION METHOD

(71) Applicant: NTT DOCOMO, INC., Tokyo (JP)

(72) Inventor: Ryosuke Osawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/621,619

(22) PCT Filed: Jun. 12, 2017

(86) PCT No.: PCT/JP2017/021676
§ 371 (c)(1),
(2) Date: Dec. 11, 2019

(87) PCT Pub. No.: WO2018/229837
PCT Pub. Date: Dec. 20, 2018

(65) Prior Publication Data
US 2020/0145839 A1    May 7, 2020

(51) Int. Cl.
*H04W 16/32* (2009.01)
*H04L 5/00* (2006.01)
(Continued)

(52) U.S. Cl.
CPC ............ *H04W 16/32* (2013.01); *H04L 5/001* (2013.01); *H04W 52/325* (2013.01); *H04W 52/367* (2013.01); *H04W 84/045* (2013.01)

(58) Field of Classification Search
CPC . H04W 16/32; H04W 52/325; H04W 52/367; H04W 84/045; H04W 72/0446;
(Continued)

(56) References Cited

U.S. PATENT DOCUMENTS

2017/0142668 A1* 5/2017 Takeda ................ H04W 52/367
2017/0164410 A1* 6/2017 Takeda ............... H04W 72/0413
(Continued)

FOREIGN PATENT DOCUMENTS

JP    WO2015/186824 A1    4/2017

OTHER PUBLICATIONS

LG Electronics, Discussion on power sharing for LTE-NR DC [online], 3GPP TSG-RAN WG#89 R1-1707683, <URL:http://www.3gpp.org/ftp/TSG_RAN/WG1_RL1/TSGGR1_89/Docs/R1-1707683.zip>, May 15, 2017 (Year: 2017).*
(Continued)

*Primary Examiner* — Ayaz R Sheikh
*Assistant Examiner* — Louis Samara
(74) *Attorney, Agent, or Firm* — Osha Bergman Watanabe & Burton LLP

(57) ABSTRACT

According to one aspect of the present invention, a user terminal has a transmission section that transmits a signal in a plurality of CGs, including a first cell group (CG) and a second CG corresponding to a longer slot length than the first CG, and a control section that controls transmission power in each CG, and the control section switches a transmission power control policy in a certain slot based on whether or not the certain slot of the first CG overlaps with a slot boundary of the second CG. According to one aspect of the present invention, even when multiple numerologies are supported in a given carrier, it is possible to reduce the decline in communication throughput and so forth.

4 Claims, 10 Drawing Sheets

(51) Int. Cl.
H04W 52/32 (2009.01)
H04W 52/36 (2009.01)
H04W 84/04 (2009.01)

(58) Field of Classification Search
CPC .... H04W 72/1289; H04W 52/34; H04L 5/001
See application file for complete search history.

(56) References Cited

U.S. PATENT DOCUMENTS

| | | | |
|---|---|---|---|
| 2017/0202025 A1 | 7/2017 | Ouchi et al. | |
| 2017/0230917 A1* | 8/2017 | Ouchi | H04W 52/367 |
| 2017/0280441 A1* | 9/2017 | Shimezawa | H04W 72/04 |
| 2018/0310257 A1* | 10/2018 | Papasakellariou | H04W 52/50 |
| 2019/0044639 A1* | 2/2019 | Ouchi | H04W 72/0446 |
| 2019/0215784 A1* | 7/2019 | Hwang | H04W 52/346 |
| 2020/0296673 A1* | 9/2020 | Ouchi | H04W 52/38 |

OTHER PUBLICATIONS

Huawei, HiSilicon, Power control for CA and DC, 3GPP TSG-RAN WG1#89 R1-1706904, <URL:http://www.3gpp.org/ftp/TSG_RAN/WG1_RL/TSGR1_89/Docs/R1-1706904.zip>, May 19, 2017 (Year: 2017).*
International Search Report issued in PCT/JP2017/021676 dated Aug. 15, 2017 (2 pages).
Written Opinion of the International Searching Authority issued in in PCT/JP2017/021676 dated Aug. 15, 2017 (3 pages).
LG Electronics; "Discussion on power sharing for LTE-NR DC"; 3GPP TSG RAN WG1 Meeting #89, R1-1707683; Hangzhou, P.R. China; May 15-19, 2017 (4 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Office Action issued in the counterpart Japanese Patent Application No. 2019-524573, dated Sep. 14, 2021 (6 pages).
Samsung; "Power control for UL eMBB/URLLC multiplexing"; 3GPP TSG RAN WG1 Meeting #88bis, R1-1705409 Spokane, USA, Apr. 3-7, 2017 (5 pages).
InterDigital Inc.; "Multiplexing of low-latency traffic and non-latency sensitive traffic in UL"; 3GPP TSG RAN WG1 Meeting #89, R1-1708355, May 15-19, 2017 (3 pages).
Office Action issued in the counterpart Japanese Patent Application No. 2019-524573, dated Jan. 11, 2022 (6 pages).

* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, the specifications of LTE-A (LTE advanced and LTE Rel. 10, 11, 12 and 13) have also been drafted for the purpose of achieving increased capacity and enhancement beyond LTE (LTE Rel. 8 and 9).

Successor systems of LTE are also under study (for example, referred to as "FRA (Future Radio Access)," "5G (5th Generation mobile communication system)," "5G+ (plus)," "NR (New Radio)," "NX (New radio access)," "FX (Future generation radio access)," "LTE Rel. 14 or 15 and later versions," etc.).

With LTE Rel. 12, dual connectivity (DC) has been introduced, in which multiple cell groups (CGs) are configured in a user terminal (UE (User Equipment)). Each cell group is comprised of at least 1 cell (component carrier (CC)).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

In future radio communication systems (for example, NR), multiple numerologies may be supported in a given carrier. A numerology may refer to a communication parameter to use to transmit and/or receive a certain signal and/or channel, and may be specified, for example, by subcarrier spacing (SCS), the length of a transmission time interval (TTI) (for example, the length of a slot), and so forth.

In the event the slot length is variable, applying the method of distributing transmission power such as used in conventional DC is applied to NR, might result in the situation where the maximum transmission power given to UE cannot be utilized efficiently, or where the burden of the UE will increase. The problem then is that the quality of communication, as well as communication throughput, might deteriorate.

It is therefore an object of the present invention to provide a user terminal and a radio communication method, whereby, even when multiple numerologies are supported in a given carrier, it is possible to reduce the decline in communication throughput and so forth.

Solution to Problem

According to one aspect of the present invention, a user terminal has a transmission section that transmits a signal in a plurality of CGs, including a first cell group (CG) and a second CG corresponding to a longer slot length than the first CG, and a control section that controls transmission power in each CG, and the control section switches a transmission power control policy in a certain slot based on whether or not the certain slot of the first CG overlaps with a slot boundary of the second CG.

Advantageous Effects of Invention

According to one aspect of the present invention, even when multiple numerologies are supported in a given carrier, it is possible to reduce the decline in communication throughput and so forth.

DESCRIPTION OF EMBODIMENTS

In LTE Rel. 12, power control modes (PCM) 1 and 2 are defined for DC. PCM 1 is a mode that assumes that the MCG (Master CG) and an SCG (Secondary CG) are synchronous, and PCM 2 is a mode that assumes that the MCG and an SCG are asynchronous.

Figure 1:
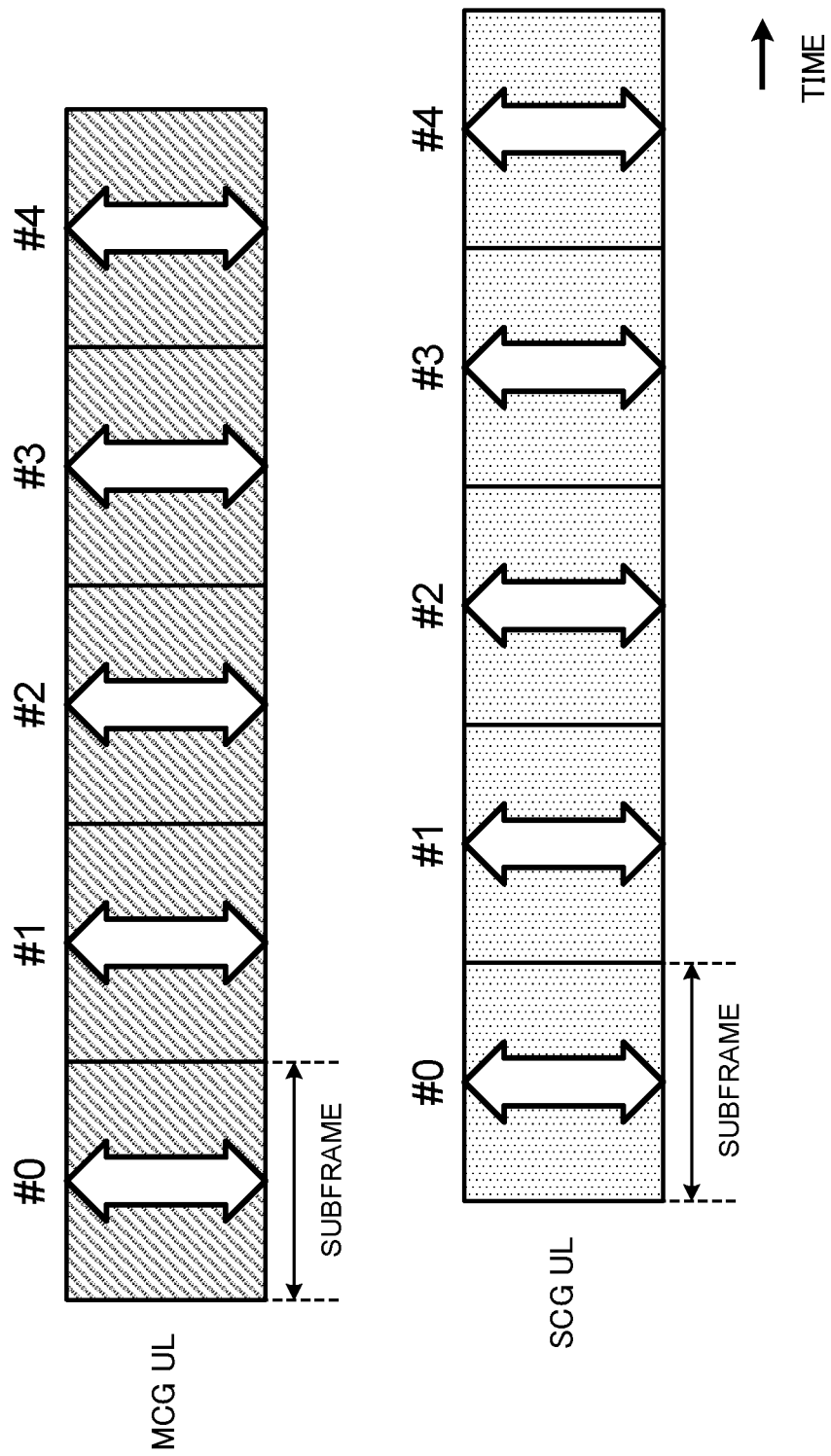
FIG. 1 is a diagram to show an example of power control based on PCM 2 in DC.

FIG. 1 is a diagram to show an example of power control based on PCM 2 in DC. FIG. 1 shows uplink subframes #0 to #4 of an MCG and an SCG, and shows an example in which the MCG's subframe precedes the SCG's subframes.

When using PCM 2, the UE distributes transmission power in order from the preceding subframes. In this example, the UE first allocates transmission power to all the UL serving cells in the MCG, in subframe #0 of the MCG. Next, the UE allocates transmission power to all the UL serving cells in the SCG, in subframe #0 of the SCG, in the range of transmission power, not including the transmission power allocated to subframe #0 of the MCG.

In this way, in PCM 2, the transmission power of a given CG in subframe # i is determined by maintaining the transmission power of another CG in subframe # i–1.

However, for NR, multiple numerologies may be supported in a given carrier.

A numerology may refer to communication parameters that are applied to transmission and/or receipt of a given signal and/or channel, and represent at least one of the subcarrier spacing (SCS), the bandwidth, the length of symbols, the length of cyclic prefixes, the length of TTIs (for example, the length of slots), the number of symbols per TTI, the radio frame configuration, the filtering process, the windowing process and so on.

Figure 2:
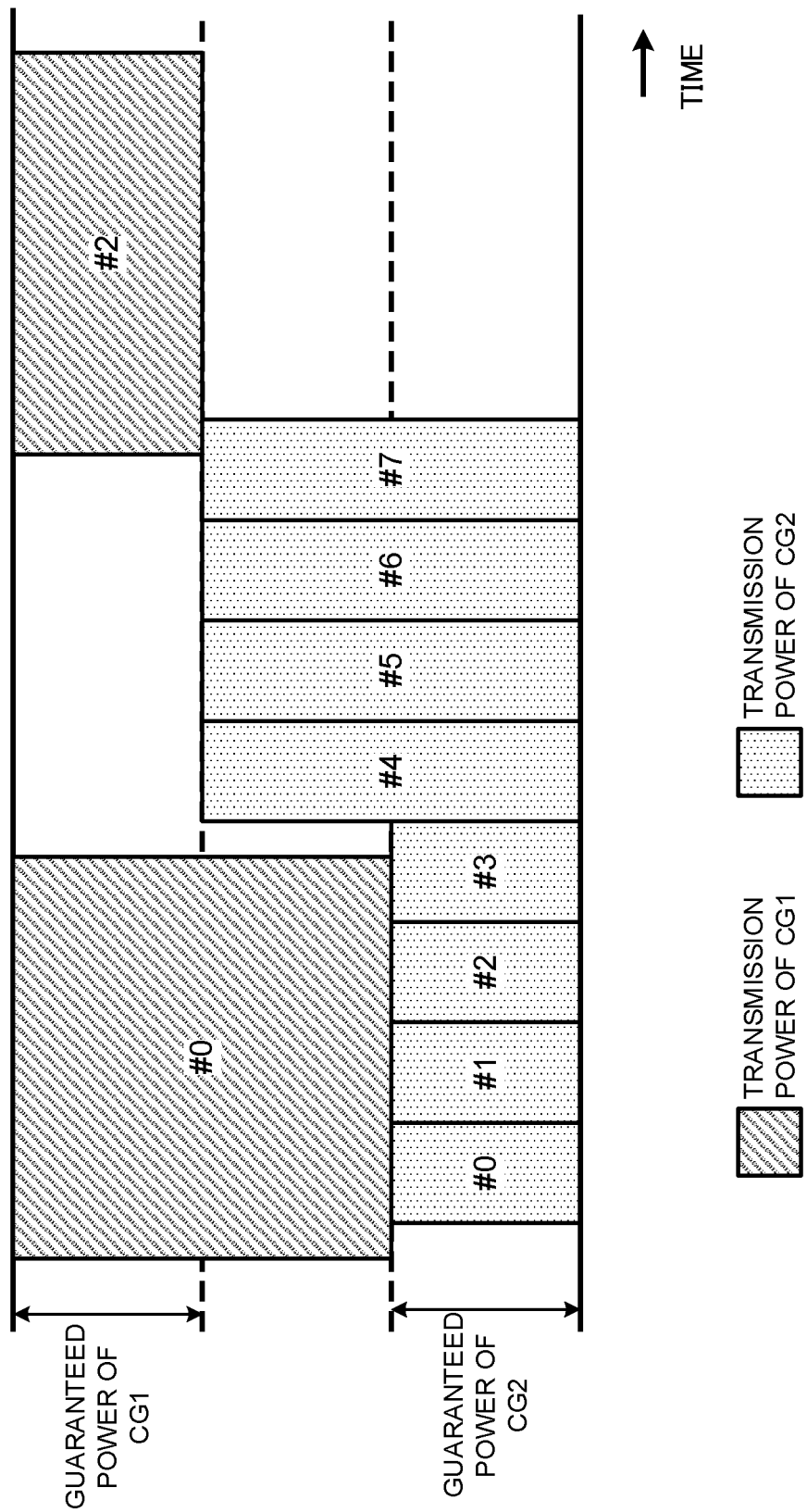
FIG. 2 is a diagram to show an example of a problem that arises when power control based on PCM 2 in DC is applied to NR.

If the slot length, the symbol length and the like are variable, there is a risk of wasting transmission power. This will be described below in detail with reference to FIG. 2. FIG. 2 is a diagram to show an example of a problem that arises when power control based on PCM 2 in DC is applied to NR.

FIG. 2 shows the transmission power of uplink slots of CG 1 and CG 2. For CG 1, the transmission power of slots #0 and #2 is shown, on the assumption that no transmission takes place in slot #1. In addition, for CG 2, the transmission power of slots #0 to #7 is shown. In this example, the slot of CG 1 precedes the slots of CG 2. Note that, CG 1 and/or CG 2 may be CGs corresponding to MCGs, may be CGs corresponding to SCGs, or may pertain to other CGs.

Also, FIG. 2 shows the guaranteed power of each CG. Each CG's guaranteed power is configured in UE by higher layer signaling (for example, RRC (Radio Resource Control) signaling). For the transmission power in a CG where guaranteed power is configured, at most this guaranteed power or an equivalent can be reserved even when very large power is required in other CGs.

In other words, the transmission power in a given CG can be allocated within the range of the maximum possible transmission power (the UE's maximum allowable transmission power) minus the sum of the guaranteed power of other CGs. It is assumed that the required power of each CG is the maximum possible transmission power throughout this example.

The UE first allocates transmission power for all the UL serving cells in CG 1, in slot #0 of CG 1. The total transmission power for CG 1 in slot #0 of CG 1 is the value obtained by subtracting the guaranteed power for CG 2 from the maximum allowable transmission power.

In slots #0 to #3 of CG 2, slot #0 of CG 1 is allocated power in advance, so that the total transmission power of CG 2 is the guaranteed power for CG 2.

In slots #4 to #7 of CG 2, there is no slot of CG 1 to which power is allocated in advance, so that the total transmission power of CG 2 is the value obtained by subtracting the guaranteed power of CG 1 from the maximum allowable transmission power.

In slot #2 of CG 1, slot #7 of CG 2 is allocated power in advance, so that the total transmission power of CG 1 is the guaranteed power for CG 1. Even after slot #7 of CG 2 is finished, the power in slot #2 of CG 1 is kept at the guaranteed power for CG 1. The reason for this is that if the average transmission power changes in the middle of a slot, signals cannot be decoded, interference against other UEs is produced, and so forth.

In this way, when a symbol of a CG where the slot length is short precedes and overlaps with a symbol of a CG with a longer slot length, even when there are no subsequent symbol in the CG with the shorter slot length, the transmission power of the CG with the longer slot length is limited. Applying the method of distributing transmission power in order from preceding slots based on conventional PCM 2 to NR, might lead to the problem that the maximum transmission power given to UE cannot be utilized in an effective manner. The problem then is that the quality of communication, as well as communication throughput, might deteriorate.

Meanwhile, if it is preferable to maintain consistency with the control of existing LTE, it may be possible to apply the method of distributing transmission power in order from preceding slots, to NR, even by tolerating some power loss. However, the conventional PCM 2-based power control premises upon using the same TTI length between CGs, and therefore is not suitable to be used, on an as-is basis, for NR, in which different CGs use different TTI lengths. When the TTI length to serve as the unit for calculating power is too short, the burden of UE will increase, and the throughput of communication might drop.

So, the present inventors have worked on a method of distributing (sharing) transmission power properly even when multiple numerologies are supported in a given carrier, and arrived at the present invention.

Now, embodiments of the present invention will be described in detail below with reference to the accompanying drawings. Note that the radio communication methods according to the herein-contained embodiments may be used individually, or may be used in combinations.

Note that the following embodiments assume cases where, for every CG, "the required power of the CG≥UE's maximum allowable transmission power−other CGs' guaranteed power," holds. That is, in the following description, cases will be assumed in which, when power is allocated to a slot of a given CG, the transmission power for another CG's overlapping slot is limited to the guaranteed power of that another CG. However, the application of the present invention is not limited to this. For example, in the event "the required power of a given CG<UE's maximum allowable transmission power−other CGs' guaranteed power," holds, even if power is allocated to a given CG first, the transmission power of another CG might exceed the guaranteed power of this another CG. Also, the "guaranteed power of another CG" as used herein may be replaced with other power values.

(Radio Communication Method)

First Embodiment

According to a first embodiment of the present invention, UE switches the method (or policy) for controlling transmission power in a slot of a certain CG based on whether the certain CG's slot is located on (or overlaps in time with) slot boundaries of another CG (for example, another CG with a longer slot length).

For example, when a slot of a certain slot is located on a slot boundary of another CG, UE limits the transmission power in the slot of the certain CG to certain power at most. On the other hand, when a slot of a certain slot is not located on a slot boundary of another CG, UE may allocate the transmission power in the slot of the certain CG beyond certain power.

Here, the above certain power may be the guaranteed power of the certain CG (guaranteed power granted to the serving CG), or may be power that is configured or indicated separately for the certain CG (and that may be referred to as, for example, "configured limit power"), or power defined in the specification.

When a slot of the certain CG is located on a slot boundary of another CG and transmission power is allocated to the preceding slots of the other CG, the UE may limit the transmission power in the slot of the certain CG to the guaranteed power of the certain CG even when limited power is configured and given to the certain CG. Note that, in the event "the transmissions power of a preceding slot of another CG<UE's maximum allowable transmission power−certain power" holds, the UE may allocate transmission power in the slot of the certain CG beyond the certain power.

The power that is configured or indicated separately may be reported by using higher layer signaling (for example, RRC signaling, broadcast information (MIB (Master Information Block), SIB (System Information Block), etc.), MAC (Medium Access Control) signaling), physical layer signaling (for example, DCI (Downlink Control Information)), or a combination of these.

The above switching of transmission power control may be applied to all CGs, or may be applied only to part of the CGs (for example, SCGs). For example, when the above switching of transmission power control is applied only to SCGs, power is preferentially distributed to the MCG.

Whether or not transmission power control is switched as described above (that is, whether the above-described switching of transmission power control is enabled or disabled), which CGs are subject to the above-described switching of transmission power control, and so forth may be reported by using higher layer signaling (for example, RRC signaling, broadcast information (for example, SIB), MAC signaling, etc.), physical layer signaling (for example, DCI) or a combination of these, or may be defined in the specification.

Also, the above-described switching of transmission power control may be applied to all channels (for example, an uplink control channel (PUCCH (Physical Uplink Control CHannel)), an uplink shared channel (PUSCH (Physical Uplink Shared CHannel)), etc.) and signals (for example, measurement reference signals (SRSs (Sounding Reference Signals)), or may be applied to only some channels and/or signals. For example, the above-described switching of transmission power control may be configured to be applied to the PUCCH, and not applied to the PUSCH.

Channels and/or signals to which the above transmission power control switching is applied may be reported by using higher layer signaling (for example, RRC signaling, broadcast information (for example, SIBs), MAC signaling, etc.), physical layer signaling (for example, DCI) or a combination of these, or may be defined by the specification.

Figure 3:
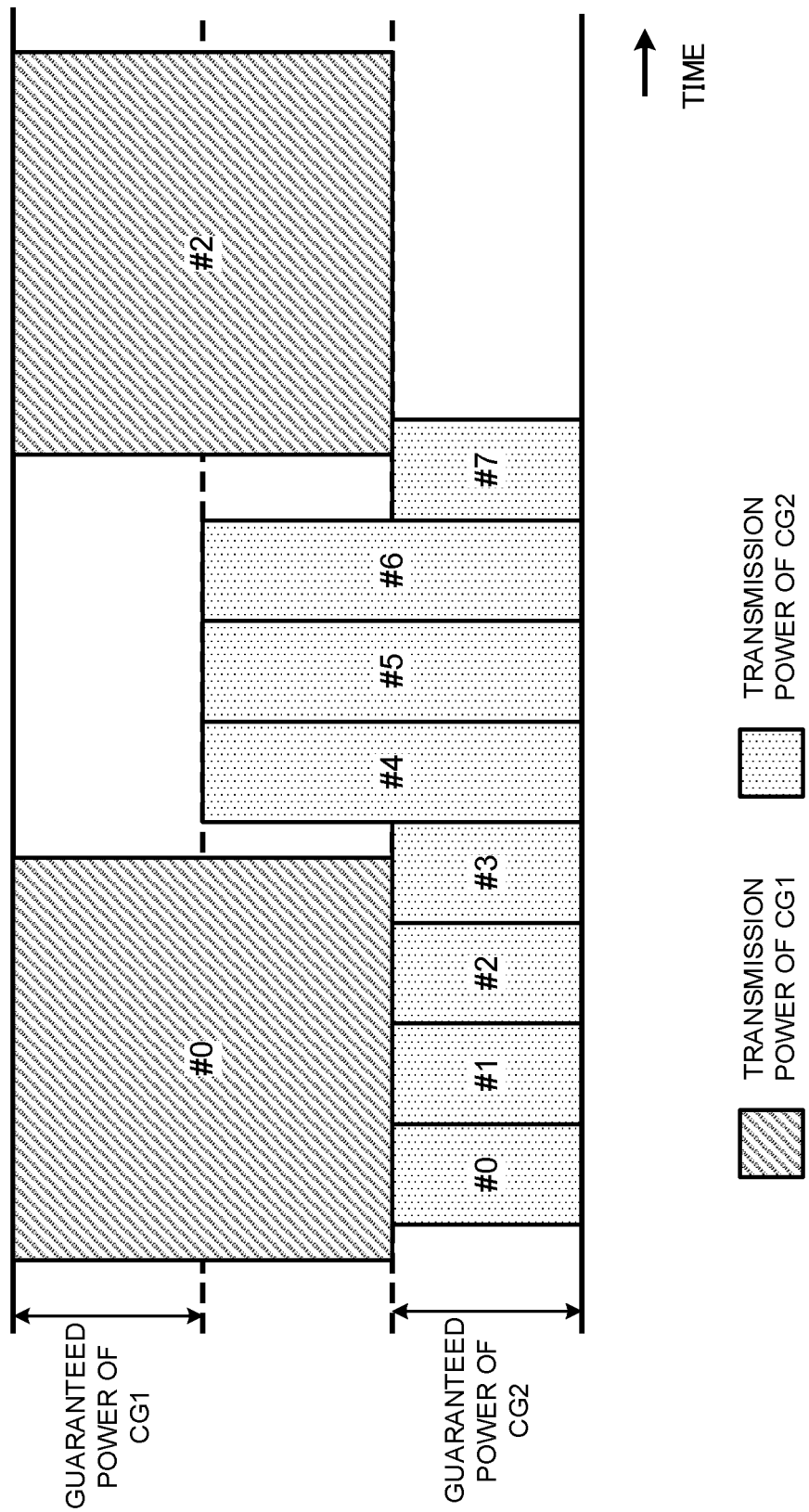
FIG. 3 is a diagram to show an example of power control according to a first embodiment of the present invention.

FIG. 3 is a diagram to show an example of power control according to the first embodiment. This example assumes the same case as that illustrated in FIG. 2. CG 2 has a shorter slot length than CG 1. The slots of CG 2 that are located on the slot boundary of CG 1 correspond to slots #3 and #7 in the illustrated range. In this example, the transmission power in slot #3 of CG 2 is limited to the guaranteed power for CG 2 because power is first allocated to slot #0 of CG 1.

Meanwhile, although there is no overlapping and preceding transmission related to CG 1, the transmission power in slot #7 of CG 2 is limited to the guaranteed power for CG 2 (or to the limit power configured for CG 2, if any). Therefore, in slot #2 of CG 1, even though power is first allocated to slot #7 of CG 2, the total transmission power for CG 1 can be allocated beyond the guaranteed power of CG 1 (for example, the UE's maximum allowable transmission power−the guaranteed power (or the configured limit power) for CG 2).

Note that the UE makes transmission in CG 1, in slot #0 to #2 of CG 2, so that the total transmission power of CG 2 is the guaranteed power of CG 2.

Also, in slots #4 to #6 of CG 2, the UE does not make transmission in CG 1, so that the total transmission power of CG 2 can exceed the guaranteed power for CG 2, and is the value obtained by subtracting the guaranteed power for CG 1 from the maximum allowable transmission power. Note that it is clear that slots #4 to #6 of CG 2 are not located on the slot boundaries of another CG (CG 1), and that no transmission takes place in the other CG here. Therefore, the UE may make transmission in slots #4 to #6 of CG 2, by using the maximum possible transmission power, regardless of the guaranteed power of CG 1.

According to the first embodiment described above, even if transmission of a CG using a shorter slot length precedes and overlaps transmission of a CG using a longer slot length, the transmission power of the CG of the shorter slot length can be reduced, and the maximum transmission power given to UE can be used in an effective manner.

Second Embodiment

According to a second embodiment of the present invention, UE controls the transmission power in a plurality of slots of a certain CG (for example, a CG to use a shorter slot length) all together. A group comprised of multiple slots may be referred to as a "slot group," or may simply be referred to as a "group." The UE determines the transmission power of a group, and applies the determined transmission power to each slot in the group.

The time length of a group in a certain CG may be determined based on the slot length in a CG using a longer slot length. For example, the UE may determine the time length of a group in a certain CG to be the same as the slot length of the CG where the longest slot length is configured, or to be an integral multiple, an integral fraction and the like of the slot length in at least 1 CG with a longer slot length. The UE may determine the time length of a group in a certain CG to be the greatest common divisor of the slot lengths of a plurality of CGs with longer slot lengths.

The time length of a group in a given CG may be reported by using higher layer signaling (for example, RRC signaling, broadcast information (for example, SIB), MAC signaling), physical layer signaling (for example, DCI) or a combination of these, or may be defined by a specification.

If the time length of a group in a certain CG and the slot length in another CG are the same, the power control in these CGs is equivalent to the conventional control based on PCM 2 except that subframes are replaced with slots or slot groups.

Note that, whether or not transmission power is controlled per group as described above (that is, whether the above-described transmission power control is enabled or disabled), which CGs are subject to the above-described transmission power control of group units, and so forth may be reported by using higher layer signaling (for example, RRC signaling, broadcast information (for example, SIB), MAC signaling, etc.), physical layer signaling (for example, DCI) or a combination of these, or may be defined in the specification.

Also, the above-described transmission power control of groups units may be applied to all channels (for example, an uplink control channel (PUCCH (Physical Uplink Control CHannel)), an uplink shared channel (PUSCH (Physical Uplink Shared CHannel)), etc.) and signals (for example, measurement reference signals (SRSs (Sounding Reference Signals)), or may be applied to only some channels and/or signals.

The channel and/or signal to which the above-described transmission power control of group units is applied may be reported by using higher layer signaling (for example, RRC signaling, broadcast information (for example, SIB), MAC signaling), physical layer signaling (for example, DCI), or a combination of these, or may be defined by a specification.

Figure 4:
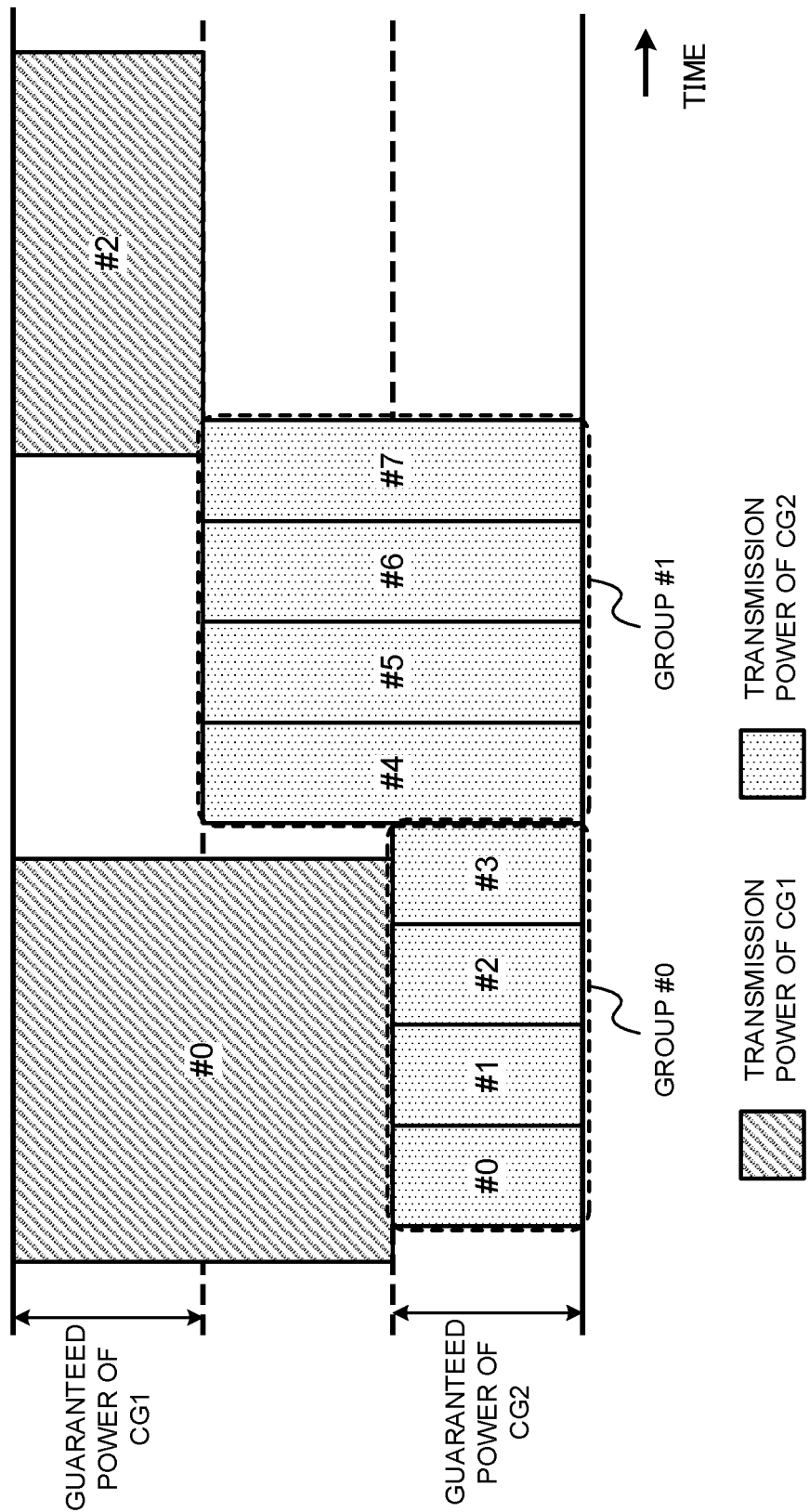
FIG. 4 is a diagram to show an example of power control according to a second embodiment of the present invention.

FIG. 4 is a diagram to show an example of power control according to the second embodiment. This example assumes the same case as that illustrated in FIG. 2. The slot length of CG 2 is ¼ of the slot length of CG 1. In this example, group-based power control is employed for CG 2, and the case is shown here where the group is comprised of 4 slots of CG 2. Group #0 corresponds to slots #0 to #3, and group #1 corresponds to slots #4 to #7.

In group #0 of CG 2, UE makes transmission in CG 1, so that the total transmission power of CG 2 is the guaranteed power of CG 2.

Also, in group #1 of CG 2, the UE does not make preceding transmission in CG 1, so that the total transmission power of CG 2 can exceed the guaranteed power for CG 2, and is the value obtained by subtracting the guaranteed power for CG 1 from the maximum allowable transmission power.

According to the second embodiment described above, even when different slot lengths are used between CGs, the same control as the conventional power control of PCM2 can be implemented in a suitable manner. For example, even when a CG in which a very short slot length is configured is used, it is still possible to reduce the increase in the burden of UE.

Variations

Note that the first embodiment and the second embodiment may be used in combination. For example, in the same case as illustrated in FIG. 2, a group may be constituted by 2 slots of CG 2 so that group #0 are configured in association with slots #0 and #1, group #1 with slots #2 and #3, group #2 with slots #4 and #5, group #3 with slots #6 and #7. In this case, the transmission power of group #3 is limited to the guaranteed power for CG 2 (if any, to the limit power configured for CG 2).

By such combinations, the tradeoff between effective use of maximum transmission power and the burden of UE may be adjusted.

Furthermore, the transmission power control in units of groups described above with the second embodiment is not limited to the case where CGs are asynchronous, but may be also applicable when CGs are synchronized.

Moreover, although cases have been primarily described with the above embodiments where 2 CGs are configured in UE for simplicity, the present invention is equally applicable even if 3 or more CGs are configured.

Moreover, a CG in the above-mentioned embodiment may be replaced with one or more CCs (cells).

(Radio Communication System)

Now, the structure of a radio communication system according to one embodiment of the present invention will be described below. In this radio communication system, communication is performed using one of the radio communication methods according to the herein-contained embodiments of the present invention, or a combination of these.

Figure 5:
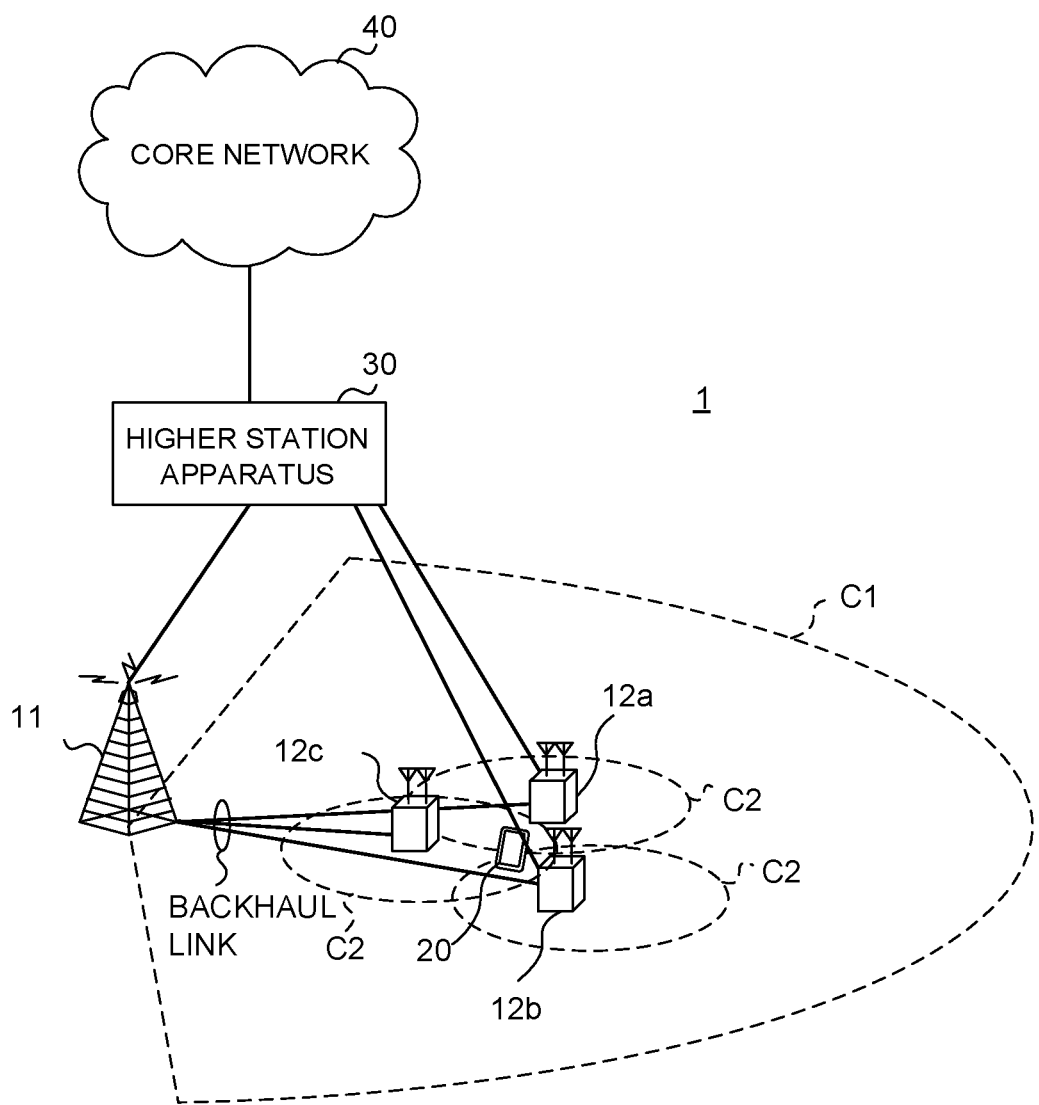
FIG. 5 is a diagram to show an exemplary schematic structure of a radio communication system according to one embodiment of the present invention.

FIG. 5 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement and number of cells and user terminals 20 and so forth are not limited to those illustrated in the drawing.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD), in each cell. Furthermore, in each cell (carrier), a single numerology may be used, or a plurality of different numerologies may be used.

A numerology may refer to communication parameters that are applied to transmission and/or receipt of a given signal and/or channel, and represent at least one of the subcarrier spacing, the bandwidth, the duration of symbols, the length of cyclic prefixes, the duration of subframes, the length of TTIs, the number of symbols per TTI, the radio frame configuration, the filtering process, the windowing process and so on.

The radio base station 11 and a radio base station 12 (or 2 radio base stations 12) may be connected with each other by cables (for example, by optical fiber, which is in compliance with the CPRI (Common Public Radio Interface), the X2 interface and so on), or by radio.

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information, SIBs (System Information Blocks) and so on are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), which includes PDSCH and/or PUSCH scheduling information, and so on are communicated by the PDCCH.

Note that scheduling information may be reported in DCI. For example, DCI to schedule receipt of DL data may be referred to as a "DL assignment," and DCI to schedule UL data transmission may also be referred to as a "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs (Sounding Reference Signals)), demodulation reference signals (DMRSs) and so on are communicated as uplink reference signals. Note that the DMRSs may be referred to as "user terminal-specific reference signals (UE-specific reference signals)." Also, the reference signals to be communicated are by no means limited to these.

(Radio Base Station)

Figure 6:
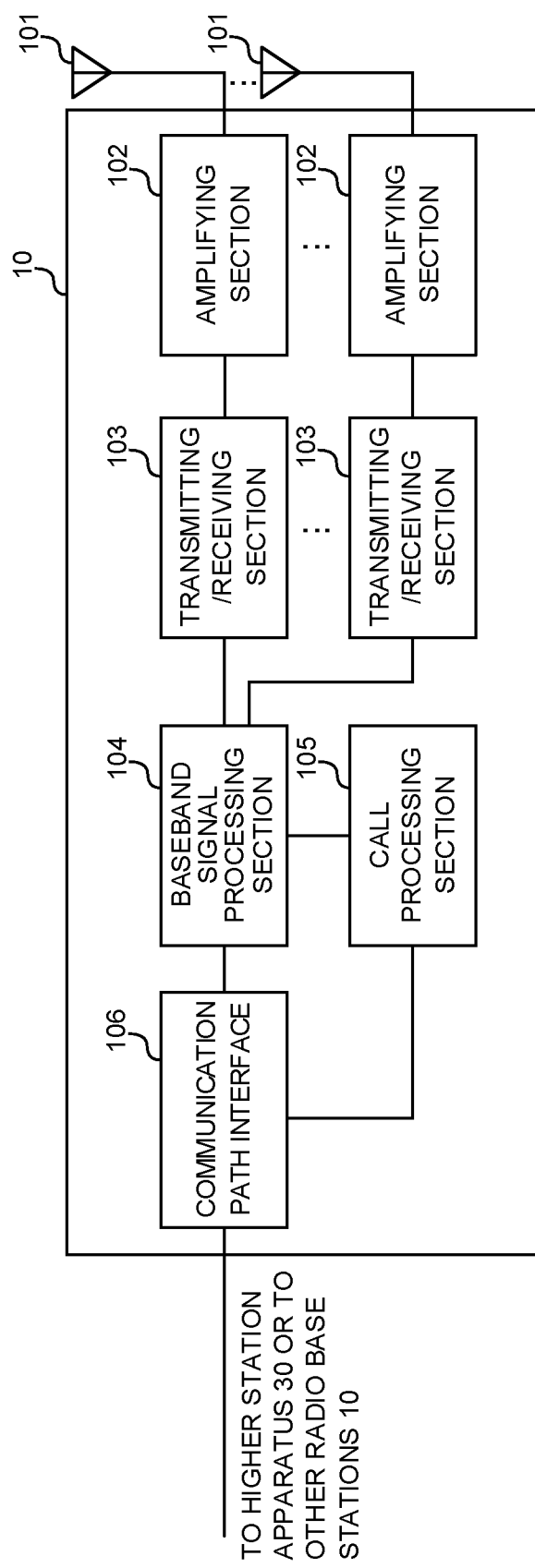
FIG. 6 is a diagram to show an exemplary overall structure of a radio base station according to one embodiment of the present invention.

FIG. 6 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a certain interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 transmit signals in at least one of a plurality of CGs, including a first CG, and a second CG corresponding to a longer slot length than that of the first CG.

Also, the transmitting/receiving sections 103 may transmit information as to whether or not to transmission power control is switched, information about CGs that are subject to switching of transmission power control, information about certain power (for example, when a certain slot of the first CG overlaps a slot boundary of the second CG, the upper limit value of transmission power in the certain slot), information about the time length of a group in a certain CG, information as to whether or not transmission power is controlled in units of groups, and information about CGs that are subject to transmission power control in units of groups and so forth, to the user terminal 20.

Figure 7:
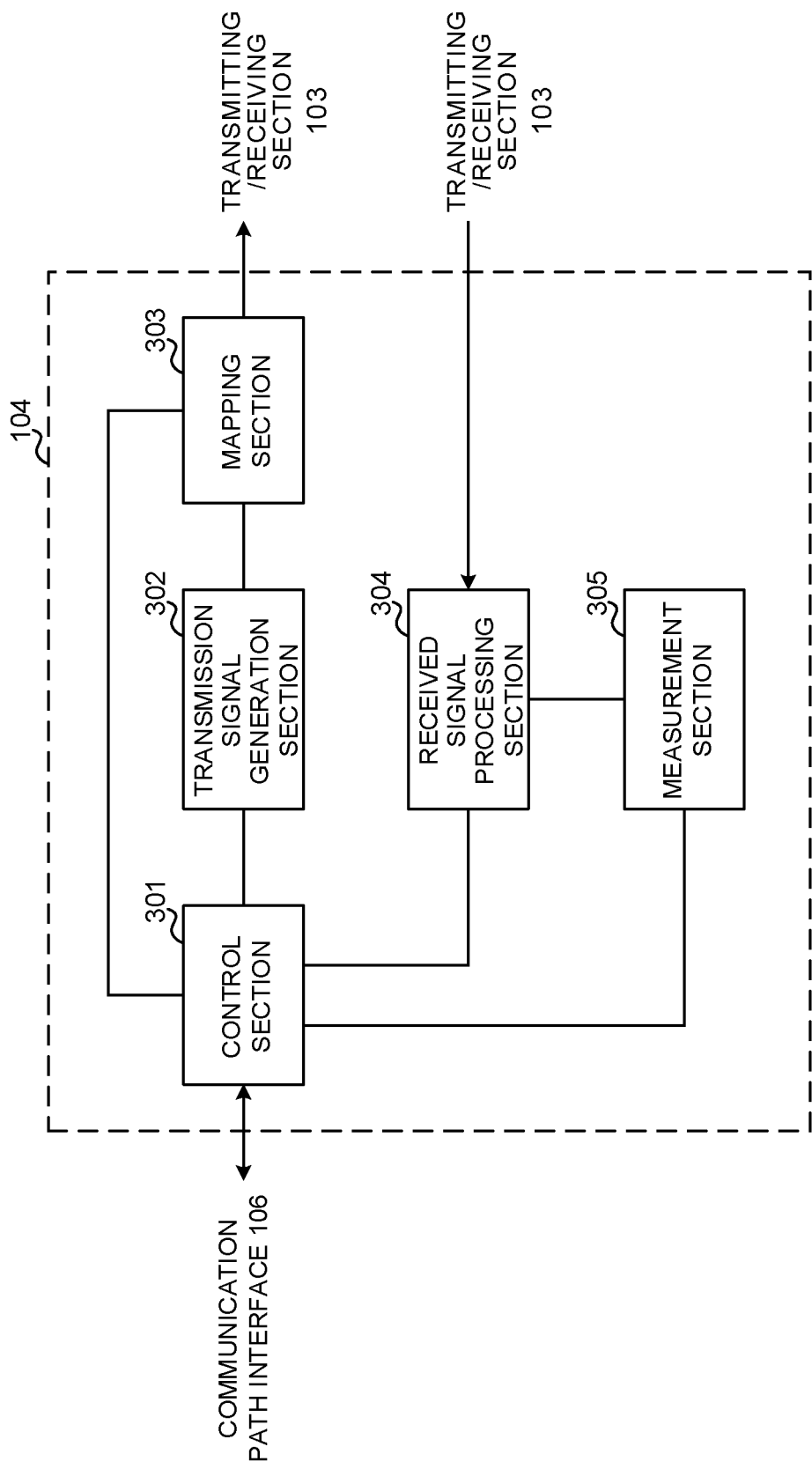
FIG. 7 is a diagram to show an exemplary functional structure of a radio base station according to one embodiment of the present invention.

FIG. 7 is a diagram to show an exemplary functional structure of a radio base station according to one embodiment of the present invention. Note that, although this example primarily shows functional blocks that pertain to characteristic parts of the present embodiment, the radio base station 10 may have other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301 controls, for example, generation of signals in the transmission signal generation section 302, allocation of signals in the mapping section 303, and so on. Furthermore, the control section 301 controls signal receiving processes in the received signal processing section 304, measurements of signals in the measurement section 305, and so on.

The control section 301 controls the scheduling (for example, resource allocation) of system information, downlink data signals (for example, signals transmitted in the PDSCH) and downlink control signals (for example, signals transmitted in the PDCCH and/or the EPDCCH, such as delivery acknowledgment information). Also, the control section 301 controls the generation of downlink control signals, downlink data signals and so on, based on the results of deciding whether or not retransmission control is necessary in response to uplink data signals and so on. Also, the control section 301 controls the scheduling of synchronization signals (for example, PSS (Primary Synchronization Signal)/SSS (Secondary Synchronization Signal)), downlink reference signals (for example, CRSs, CSI-RSs, DMRSs and so on) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), uplink reference signals, and so forth.

The control section 301 exerts control so that information for controlling transmission power in each CG is transmitted to the user terminal 20. For example, the control section 301 may exert control so that, depending on whether or not a certain slot of a first CG overlaps a slot boundary of a second CG, the policy of transmission power control in the certain slot is switched.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, in compliance with DCI format. Also, the downlink data signals are subjected to the coding process, the modulation process and so on, by using coding rates and modulation schemes that are selected based on, for example, channel state information (CSI) from each user terminal 20.

The mapping section 303 maps the downlink signals generated in the transmission signal generation section 302 to certain radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes, to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), etc.), SNR (Signal to Noise Ratio), the signal strength (for example, RSSI (Received Signal Strength Indicator)), transmission path information (for example, CSI) and so on. The measurement results may be output to the control section 301.

(User Terminal)

Figure 8:
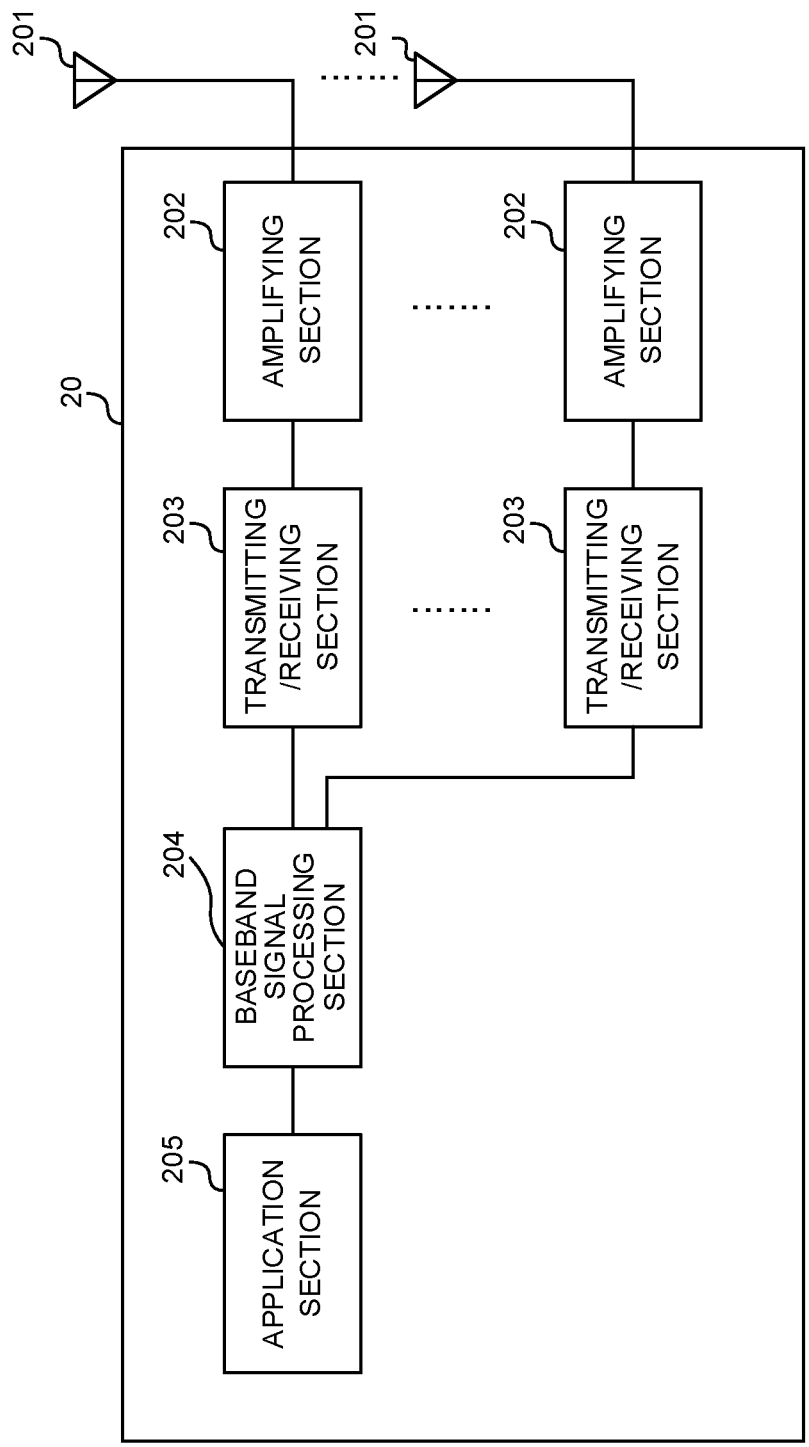
FIG. 8 is a diagram to show an exemplary overall structure of a user terminal according to one embodiment of the present invention.

FIG. 8 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. In the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 transmit signals in a plurality of CGs, including a first CG, and a second CG corresponding to a longer slot length than that of the first CG.

Also, the transmitting/receiving sections 203 may transmit information as to whether or not to transmission power control is switched, information about CGs that are subject to switching of transmission power control, information about certain power (for example, when a certain slot of the first CG overlaps a slot boundary of the second CG, the upper limit value of transmission power in the certain slot), information about the time length of a group in a certain CG, information as to whether or not transmission power is controlled in units of groups, and information about CGs that are subject to transmission power control in units of groups and so forth, to the user terminal 20.

Figure 9:
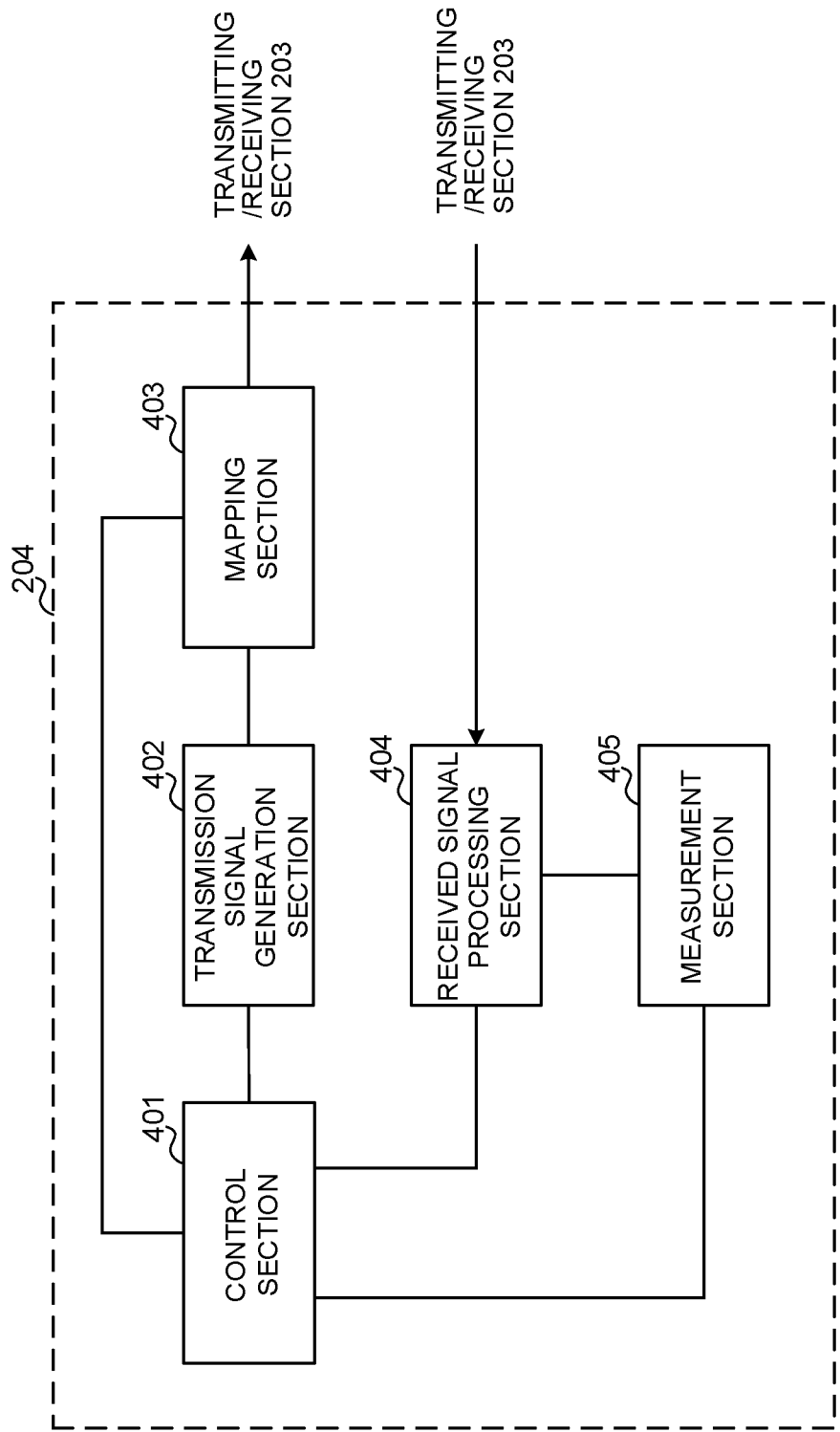
FIG. 9 is a diagram to show an exemplary functional structure of a user terminal according to one embodiment of the present invention.

FIG. 9 is a diagram to show an exemplary functional structure of a user terminal according to one embodiment of the present invention. Note that, although this example primarily shows functional blocks that pertain to characteristic parts of the present embodiment, the user terminal 20 may have other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401 controls, for example, generation of signals in the transmission signal generation section 402, allocation of signals in the mapping section 403, and so on. Furthermore, the control section 401 controls signal receiving processes in the received signal processing section 404, measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 controls transmission power in each CG. For example, the control section 401 may exert control so that, depending on whether or not a certain slot of a first CG overlaps a slot boundary of a second CG, the policy of transmission power control in the certain slot is switched. Here, the slot length in the second CG may be longer than the slot length in the first CG.

When a certain slot of the first CG overlaps a slot boundary of the second CG, the control section 401 may limit the transmission power in the certain slot to certain power (for example, to the guaranteed power for the first CG).

If a certain slot of the first CG does not overlap a slot boundary of the second CG, the control section 401 may allocate transmission power to the certain slot beyond the above certain power.

When it is indicated that the above-described switching of transmission power control policy in the first CG is enabled, the control section 401 may exert control so that, depending on whether or not a certain slot of the first CG overlaps a slot boundary of the second CG, the transmission power control policy in the certain slot is switched. That is, the control section 401 may exert control so that the above-described switching of transmission power control policy does not take place in CGs where the above-described switching of transmission power control policy is not indicated to be enabled.

The control section 401 may control transmission power in the first CG and/or the second CG in units of multiple slots (group). The total length of a plurality of slots may be the same value as the slot length in another CG, or may be a value of an integral multiple, a value of a fractional multiple and so on.

Also, when various pieces of information reported from the radio base station 10 are acquired from the received signal processing section 404, the control section 401 may update the parameters used in the control based on these pieces of information.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generation apparatus that can be described based on general understanding of the technical field to which the present invention pertains.

For example, the transmission information generation section 402 generates uplink control signals such as delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements, and so on, based on the received signals. The measurement section 405 may measure the received power (for example, RSRP), the received quality (for example, RSRQ, SINR, SNR, etc.), the signal strength (for example, RSSI), transmission path information (for example, CSI) and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by 1 piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 10:
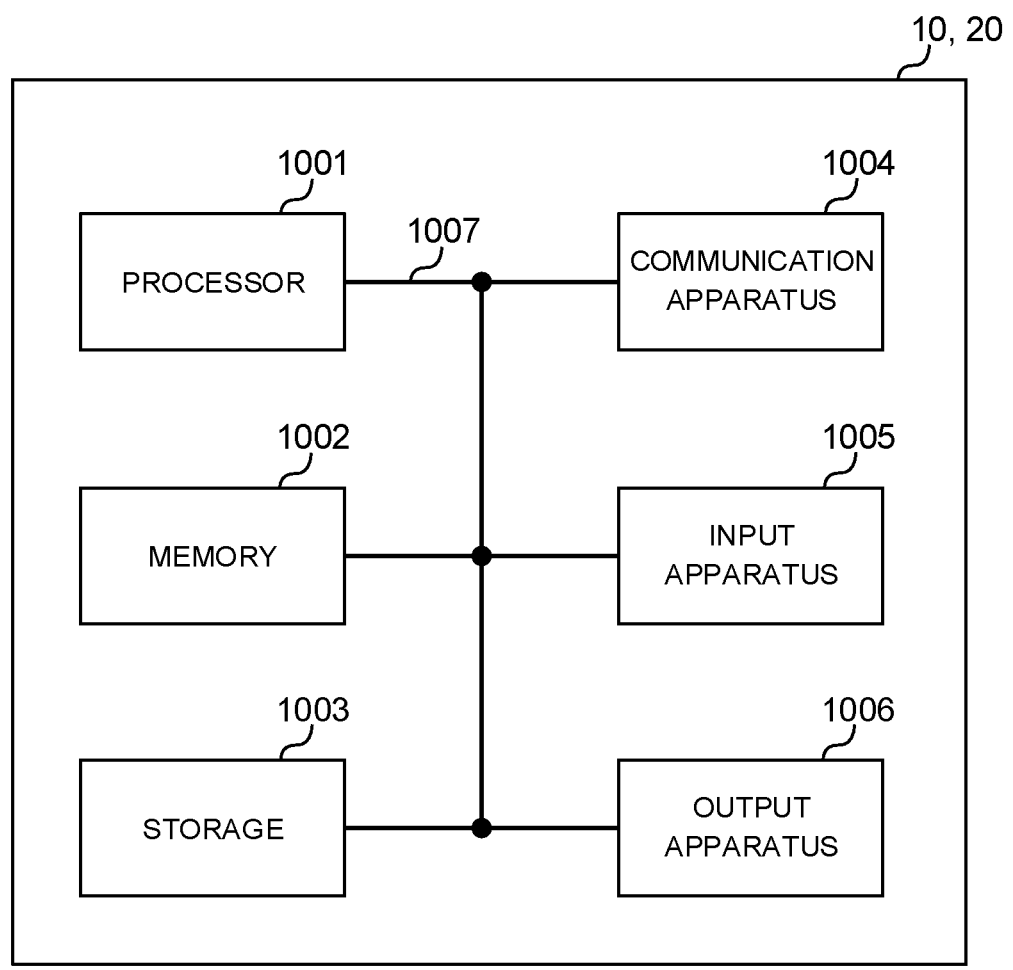
FIG. 10 is a diagram to show an exemplary hardware structure of a radio base station and a user terminal according to one embodiment of the present invention.

For example, the radio base station, user terminals and so on according to one embodiment of the present invention may function as a computer that executes the processes of the radio communication method of the present invention. FIG. 10 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only 1 processor 1001 is shown, a plurality of processors may be provided. Furthermore, processes may be implemented with 1 processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read certain software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD).

For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single-carrier Frequency Division Multiple Access) symbols, and so on). Also, a slot may be a time unit based on numerology. Also, a slot may include a plurality of mini-slots. Each mini-slot may be comprised of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, 1 subframe may be referred to as a "transmission time interval (TTI)," or a plurality of consecutive subframes may be referred to as a "TTI," or 1 slot or mini-slot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when 1 slot or 1 mini-slot is referred to as a "TTI," one or more TTIs (that is, one or multiple slots or one or more mini-slots) may be the minimum time unit of scheduling. Also, the number of slots (the number of mini-slots) to constitute this minimum time unit of scheduling may be controlled.

A TTI having a time length of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 mini-slot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to certain values, or may be represented using other applicable information. For example, a radio resource may be specified by a certain index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of certain information (for example, reporting of information to the effect that "X holds") does not necessarily have to be sent explicitly, and can be sent in an implicit way (for example, by not reporting this piece of information, by reporting another piece of information, and so on).

Decisions may be made in values represented by 1 bit (0 or 1), may be made in Boolean values that represent true or false, or may be made by comparing numerical values (for example, comparison against a certain value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, 3) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an "uplink channel" may be interpreted as a "side channel."

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only 2 elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between 2 elements that are "connected" or "coupled" to each other. The coupling or connection between the elements may be physical, logical or a combination of these. For example, "connection" may be interpreted as "access."

As used herein, when 2 elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
a transmitter that transmits a signal in a first cell group (CG) and a second CG; and
a processor that controls to limit a transmission power in the second CG to a first power, when it is notified, by using higher layer signaling, that switching of transmission power control is enabled and a transmission period in the first CG overlaps with a transmission period in the second CG,
wherein the processor controls to not limit the transmission power in the second CG to the first power when it is notified, by using higher layer signaling, that switching of transmission power control is disabled.

2. The terminal according to claim 1, wherein when the transmitter does not perform a transmission in the first CG, the processor controls to limit a transmission power in the second CG to a second power which is equal to or larger than the first power.

3. A radio communication method for a terminal, comprising:
transmitting a signal in a first cell group (CG) and a second CG; and
controlling to limit a transmission power in the second CG to a first power, when it is notified, by using higher layer signaling, that switching of transmission power control is enabled and a transmission period in the first CG overlaps with a transmission period in the second CG; and
controlling to not limit the transmission power in the second CG to the first power when it is notified, by using higher layer signaling, that switching of transmission power control is disabled.

4. A system comprising a terminal and a base station, wherein
the terminal comprises:
a transmitter that transmits a signal in a first cell group (CG) and a second CG; and
a processor that controls to limit a transmission power in the second CG to a first power, when it is notified, by using higher layer signaling, that switching of transmission power control is enabled and a transmission period in the first CG overlaps with a transmission period in the second CG,
wherein the processor controls to not limit the transmission power in the second CG to the first power when it is notified, by using higher layer signaling, that switching of transmission power control is disabled, and
the base station comprises:
a receiver that receives the signal.

* * * * *